Jan. 17, 1967     L. H. FLORA     3,298,071
FASTENER LOCKING DEVICE
Filed May 5, 1964     4 Sheets-Sheet 1

INVENTOR.
LAURENCE H. FLORA
BY *Seare, Fetzer & Seare*
ATTORNEYS

Jan. 17, 1967  L. H. FLORA  3,298,071
FASTENER LOCKING DEVICE
Filed May 5, 1964  4 Sheets-Sheet 3

INVENTOR.
LAURENCE H. FLORA
BY
Seare, Fetzer & Seare
ATTORNEYS

Jan. 17, 1967  L. H. FLORA  3,298,071
FASTENER LOCKING DEVICE
Filed May 5, 1964  4 Sheets-Sheet 4
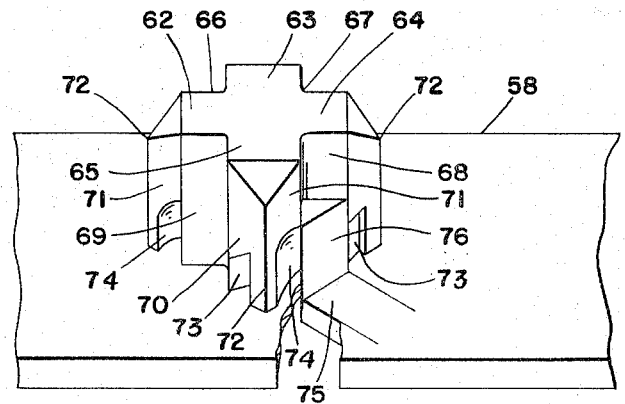
Fig. 15
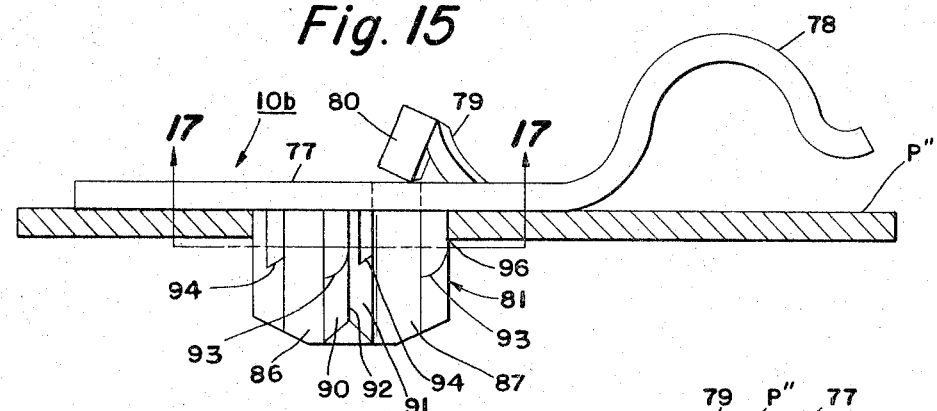
Fig. 16
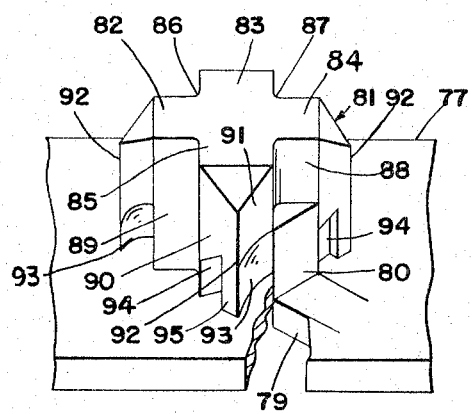
Fig. 18
Fig. 17
INVENTOR.
LAURENCE H. FLORA
BY *Jeane, Fetzer & Jeane*
ATTORNEYS

United States Patent Office 3,298,071
Patented Jan. 17, 1967

3,298,071
FASTENER LOCKING DEVICE
Laurence H. Flora, North Olmsted, Ohio, assignor to Tinnerman Products, Inc., a corporation of Ohio
Filed May 5, 1964, Ser. No. 364,994
13 Claims. (Cl. 24—73)

This invention relates to fastening devices and more particularly to an improved fastener locking device for securement of a rotary, fractional turn fastener to an associated apertured member, such as a support panel for the like.

Conventionally, many non-rotary as well as rotary-type fastening devices are known and for various specific applications. Commonly, fastening devices of the latter character are generally inserted through an opening in a member, such as a support panel, and then secured thereto by turning of the fastener into locked position with the panel. The fastener may be provided with engaging portions for attaching an object, such as molding, trim strips or the like, to the panel.

Heretofore, rotary-type fastening devices have not been satisfactory nor adequate both from a production standpoint and from an installation and operating standpoint. In the main, such previously known devices have not readily lent themselves to mass production techniques; nor have such previously known devices been structurally and/or functionally adapted for providing a positive interlocked stability between the assembled parts, particularly when there exist relatively large tolerance variations, which occur between the panel opening and the fastener. This latter condition not only causes poor registration between the assembled parts, but also results in a loose-fitting and inadequate securement between the assembled parts.

Accordingly, it is an object of the present invention to provide an inexpensive, light weight rotary, fractional turn fastener and improved locking device associated therewith, which can be readily installed upon an apertured member, such as a support panel, and which can be positively and readily secured thereto upon rotary turning movement of the fastener relative to the panel.

Another object of the present invention is to provide an improved, unitary rotary fractional turn fastener made from polymeric materials and including a novel locking means made integral therewith, or separate therefrom, which can be facilely inserted through an opening in a member, such as a support panel, and which thereafter can be positively secured and locked therewith upon rotary turning movement of the fastener relative to the panel.

Other objects and advantages of the invention will be apparent from the following description taken in conjunction with the accompanying drawings, wherein:

FIG. 15 is a generally fragmentary perspective view on an enlarged scale with parts broken away and looking generally at the bottom of the fastener in FIG. 13 and showing a modified form of the depending shank construction in conjunction with the improved flexible locking means positioned at a different angle and made in accordance with the present invention;

FIG. 16 is a side elevational view on an enlarged scale and partly in section showing still another modified form of the improved rotary, fractional turn fastener made in accordance with the present invention;

FIG. 17 is a longitudinal section view taken along the plane of line 17—17 of FIG. 16; and FIG. 18 is a generally fragmentary perspective view on an enlarged scale with parts broken away and looking generally at the bottom of the fastener of FIG. 16 and showing another modified form of the depending shank construction in conjunction with the improved flexible locking means positioned at a different angle and made in accordance with the present invention.

Generally, to the accomplishment of the foregoing objects and other important advantages, the present invention is directed to a rotary, fractional turn fastener and improved construction of a locking means associated therewith for locking the fastener in its rotary installed position with an apertured support panel. More particularly, when reference is made herein to a fractional turn fastener, it is intended to include a fastener which can be rotated one-eighth of a turn; or which can be turned through an angle of approximately 45°, on the basis of a full 360° turn, to effect installation thereof. The fastener per se is preferably made from polymeric materials and includes a generally flexible body having a depending shank and/or nose construction for facile rotary, fractional turn installation with an apertured support panel. In one form, the improved locking means associated with the fastener includes a flexible, spring-like member made integral with the body and adapted to coact with the depending shank and/or nose construction and the panel opening to positively and automatically maintain the fastener in its rotary, fractional turn installed position with the panel.

In another form, the locking means includes a generally rigid detent member of predetermined cross-section made integral with or separate from the body of the fastener which by application of pressure can be depressed through the body of the fastener into interlocking engagement between the depending shank and/or nose construction and the panel opening to maintain the fastener in its rotary, fractional turn installed position with the panel.

Figure 1:
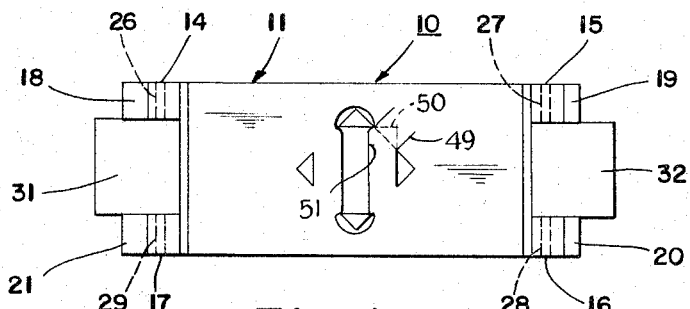
FIG. 1 is a top plan view of the improved rotary, fractional turn fastener made in accordance with the present invention.
Figure 2:
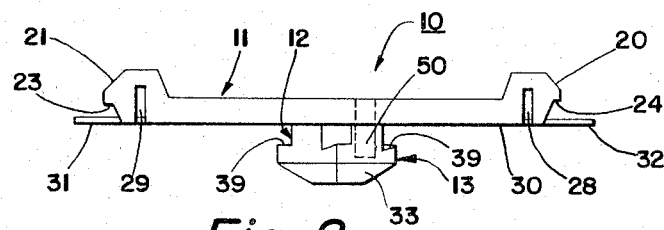
FIG. 2 is a side elevational view of the fastener of FIG. 1.
Figure 3:
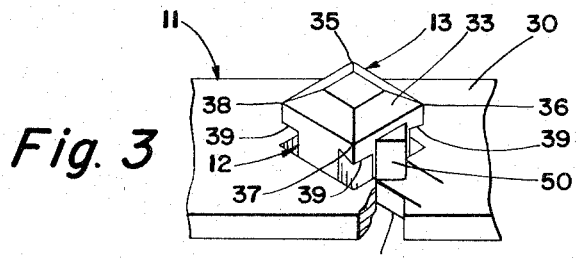
FIG. 3 is a generally fragmentary perspective view on an enlarged scale with parts broken away looking generally at the bottom of the fastener of FIG. 2 and showing the depending shank and nose construction in conjunction with the improved flexible locking means for maintaining the fastener in interlocked engagement with an apertured support panel.
Figure 4:
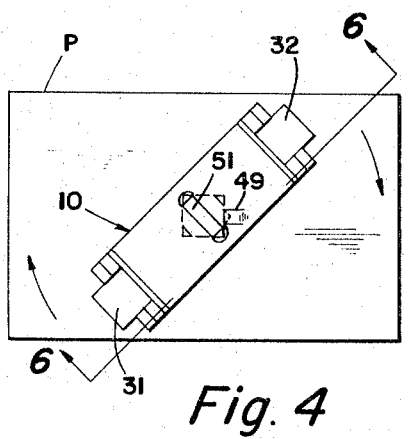
FIG. 4 is a top plan view of the fastener of FIGS. 1 to 3 shown in assembled position with an apertured support panel and prior to its rotary, fractional turn installed position.
Figure 5:
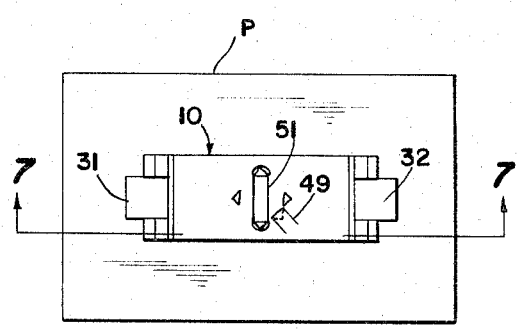
FIG. 5 is a top plan view of the fastener of FIG. 4 and showing the fastener in its final rotary, installed position after having been turned through an angle of approximately 45° for interlocking engagement with an apertured support panel.

Referring now again more particularly to FIGS. 1 to 5 of the drawings, the fastener, designated generally at 10, is preferably produced, such as by molding or extrusion, from a resilient polymeric material, such as nylon or the like. As shown, the fastener preferably includes a main body 11 and a depending shank 12 and nose 13 constructed to provide rotary, fractional turn installation with an apertured support panel P (FIGS. 4 and 5).

Figure 7:
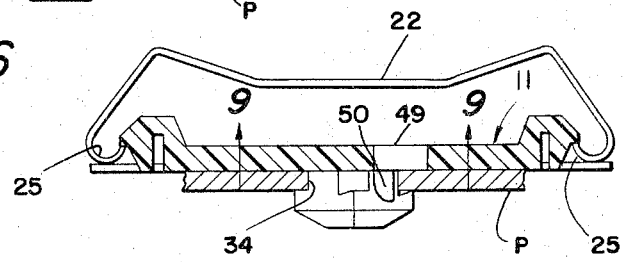
FIG. 7 is a cross sectional view on an enlarged scale taken along the plane line 7—7 of FIG. 5 and showing a molding or the like secured to the apertured support panel by means of the improved fastener made in accordance with the present invention.

The opposed ends of the body 11 are each provided with a pair of spaced, upstanding resilient shoulders 14–17. As best illustrated in FIG. 2, each of the respective shoulders 14–17 approximates a generally hexagonal, in elevation, configuration to define angularly extending cam-like surfaces 18–21 which facilitates snap-fastening engagement with an object 22, such as a hollow molding, to the panel P (FIG. 7). The cam-like surfaces 18–21 are preferably provided with undercut portions 23, 24 which cooperate with the inturned edges 25 (FIG. 7) of the molding 22 to retain the latter in assembled position with the fastener. The shoulders 14–17 may be provided with transversely extending slots 26–29 which open onto the undersurface 30 of the fastener to provide maximum lateral resiliency in the shoulders and to provide sufficient strength characteristics in the material thereby to effectively retain the molding 22 in the assembled relation with the panel P.

As it is best illustrated in FIG. 2, the fastener 10 is provided on its undersurface 30 and adjacent the opposed distal ends thereof with outwardly extending resilient wings 31, 32 made integral with and which form extensions of the undersurface 30 of the fastener. Such resilient wing construction greatly enhances the resilient characteristics of the body 11 of the fastener and provides a retaining-like self construction which cooperate with the resilient shoulders 14–17 to support the inturned edges 25 of the molding 22 in predetermined spaced relation from the panel P. Such spaced disposition of the molding 22 enables foreign materials, such as dirt, dust, water, moisture and the like to pass freely between the fastener and the panel thereby to prevent undesirable accumulation of such materials between the parts.

Figure 9:
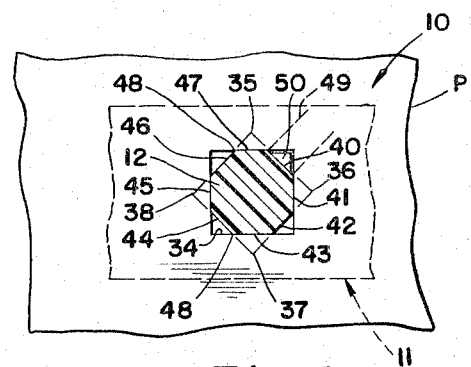
FIG. 9 is a longitudinal sectional view taken along the plane of line 9—9 of FIG. 7.

As shown in FIG. 3, the nose 13 is preferably square in cross section and includes a generally inverted truncated head portion 33 to facilitate insertion of the nose through the opening 34 in the panel P. The nose 13 is preferably of a slightly smaller cross-sectional dimension than that of the opening 34 in the panel P when, for instance, the opening 34 therein is square shaped. Thus, by insertion of the nose 13 through the opening 34 and by turning the fastener through an angle of approximately 45°, the four proximal corners 35–38 of the nose 13 are brought to overlie the confronting marginal edges presented by the opening 34 (FIG. 9). To facilitate rotary gripping action of the fastener 10 with panel P, the nose 13 is preferably provided with leading or cam-like ledge portions 39 which taper generally in the direction of rotation of the fastener.

Figure 8:
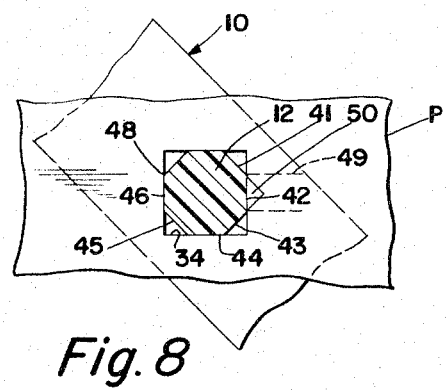
FIG. 8 is a longitudinal sectional view taken along the plane of line 8—8 of FIG. 6.

The depending shank 12 connecting the nose 13 to the body 11 of the fastener, is preferably polygonal shaped in cross section. As best shown in FIGS. 8 and 9, the shank 12 is preferably octagonal in cross section defining eight, equilateral sides 40–47. As shown, the shank 12 is preferably oriented in relation to the nose so that the four opposed flat sides (40, 42, 44 and 46) of the shank are co-extensive in cross sectional dimension with, or lie in the same vertical plane as, the four corresponding flat sides of the square shaped nose 13. Accordingly, it can be seen that the cross-sectional dimension of the shank 12, across the sides (40, 42, 44 and 46) is approximately the same as the corresponding cross-sectional dimension of the nose 13, and with this dimension being slightly smaller than that of the corresponding dimension of the square-shaped opening 34 in the support panel. Thus, upon insertion of the nose 13 through the opening 34, at least one flat side of the shank 12, namely one of sides 40, 42, 44 and 46, will be in surface-to-surface engagement with the confronting marginal edge presented by the panel opening 34; and after rotary, fractional turning of the fastener through an angle of approximately 45°, at least one of the other flat sides, namely one of sides 41, 43, 45 and 47, will be in surface-to-surface engagement with the confronting marginal edge of the opening 34 to provide a positive interlocking engagement between the panel P and the fastener 10 in its assembled positions thereof.

To further achieve interlocking engagement between the panel P and the fastener 10, the shank 12 is preferably provided with severable edge portions 48, as best shown at FIGS. 8 and 9. Hence, by turning the greater dimension of the shank 12 transversely of the panel opening 34, there is provided a firm coacting engagement with the confronting marginal edges presented by the opening due to edges cutting into the severable edge portions 48 of the shank 12 as the fastener is turned through an angle of approximately 45° into its assembled position.

In accordance with the present invention and to maintain the fastener in positive interlocking engagement with the panel P, the improved locking means in one form includes a flexible, generally L-shaped, in elevation, finger member designated generally at 49. As shown, the flexible finger member 49 is preferably formed or cut out of the body 11 of the fastener and is provided at its free end with a downwardly extending locking tab 50. The tab 50 is preferably of a cross-sectional configuration so as to be engageably nested in the space defined between the shank 12 and the confronting marginal edges of the panel opening 34. As best shown in FIG. 3, the tab 50 in the form shown is generally triangular in cross section so as to be disposed in the corresponding triangularly shaped space presented by any one of the flat sides 40–47 of the shank 12 and the confronting marginal edges presented by the panel opening 34 as determined by the rotary turned position of the fastener. To effect rotary, fractional turn installation of the fastener 10, an elongated slot 51 may be provided centrally of the body 11 of the fastener. Moreover, a suitable tool, such as a screw driver or the like, may be readily inserted therein for the purpose of applying turning pressure thereto.

Figure 6:
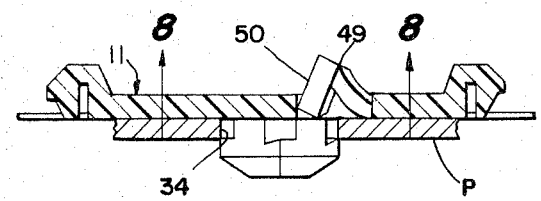
FIG. 6 is a cross sectional view on an enlarged scale taken along the plane of line 6—6 of FIG. 4.

In application of the fastener 10, the depending nose 13 is passed through the panel opening 34 so that the body 11 of the fastener will be disposed somewhat diagonally relative to the panel P, as shown in FIG. 4. As the nose 13 and shank 12 are passed through the opening 34, the depending tab 50 of the finger member 49 is brought into engagement with the confronting uppersurface of the panel P, which causes the flexible finger member 49 to flex upwardly away from the plane of the fastener, as best illustrated in FIG. 6. Upon application of pressure by means of the fingers or a suitable tool, the nose 13 is moved further axially through the opening 34 and simultaneously rotated in a clockwise direction, as shown by the arrows in FIG. 4, so that the leading or cam-like ledge portions 39 of the nose 13 engageably grip the undersurface of the panel P. Continued rotary movement of the fastener progressively draws the body 11 and wing portions 31 and 32 thereof into tight abutting engagement with the confronting uppersurface of the panel P, and brings the ledge portions 39 into overlying engagement with the confronting marginal edges of the opening 34 on the undersurface of the panel P. As the fastener approaches the 45° rotary, fractional installed position, the confronting marginal edges presented by the panel opening 34, cut into the severable ledge portions 39 to provide a surface-to-surface engagement between the flat sides (41, 43, 45 and 47) of the shank 12 and the corresponding marginal edges presented by the panel opening 34. During rotary movement of the fastener 10, the locking tab 50 of the flexible finger member 49 is automatically biased downwardly, due to the spring characteristics of the polymeric material, into the space between one of the flat sides of the shank 12 and the corresponding confronting marginal edges presented by the panel opening 34. Moreover, in the final installed position of the fastener 10, the tab 50 provides a substantially continuous surface-to-surface locking engagement between the shank 12 and the panel opening 34. Such continuous surface-to-surface disposition of the locking tab 50 effectively transmits torque forces between the fastener 10 and the panel P and prevents any accidental displacement or loosening of the fastener from its finalized, installed position with the panel P.

In this final installed and locked position, a conventional molding 22 may then be applied to the fastener 10 by snapping the inturned edges 25 of the molding 22 down over the cam surfaces 18–21 of the resilient shoulders 14–17 until the inturned edges 25 are engageably retained by the undercut recess portions 23 and 24 formed thereon.

Figure 10:
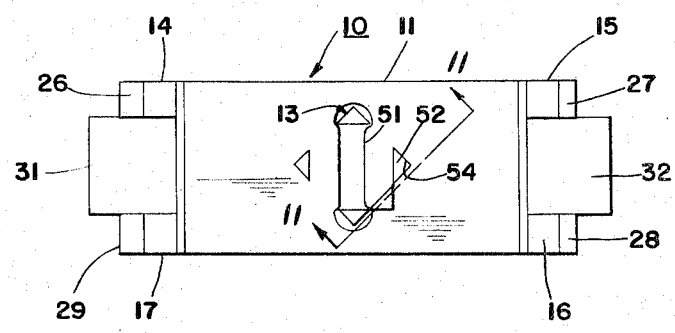
FIG. 10 is a top plan view showing a modified form of the improved rotary, fractional turn fastener made in accordance with the present invention.
Figure 11:
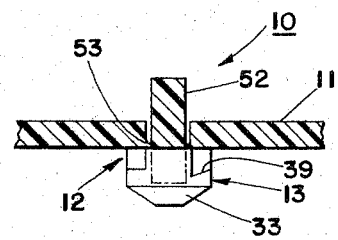
FIG. 11 is a fragmentary sectional view on an enlarged scale taken along the plane of 11—11 of FIG. 10.

In a modified form illustrated in FIGS. 10 and 11, the locking means includes a generally vertically oriented detent member 52 which may be molded or made integral with the body of the fastener, as at 53, to provide a temporary securement of the detent member 52 until the application force or pressure is applied thereto. As shown, the detent member 52 is preferably triangular in cross section and oriented on the fastener 10 so that, upon application of pressure to one end thereof, it may be forceably depressed through the body 11 of the fastener and into the generally triangular shaped space defined between any one of the flat sides 40–47 of the shank 12 and the corresponding marginal edges presented by the panel opening for engageably retaining the fastener and in the manner as aforesaid.

Figure 12:
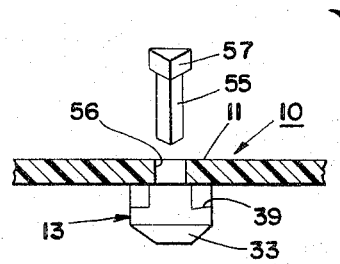
FIG. 12 is a fragmentary assembly view on an enlarged scale and partly in section showing another modified form of the improved rotary, fractional turn fastener and associated locking means made in accordance with the present invention.

As illustrated in the assembly view of FIG. 12, the detent member 55 in another modified form, can be made separate from the body 11 of the fastener 10 and adapted to be disposed through a corresponding triangular shaped opening 56 formed in the body 11. As shown, the removable detent member 55 may be provided on one end with an outwardly extending head portion 57 to facilitate insertion and removal of the same from interlocking engagement between the shank 12 and the marginal edges of the panel opening.

Figure 13:
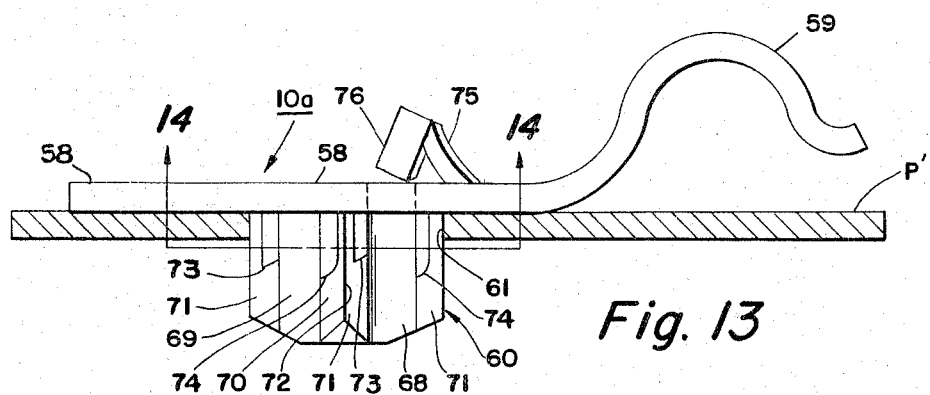
FIG. 13 is a side elevational view on an enlarged scale and partly in section and showing another modified form of the improved rotary, fractional turn fastener made in accordance with the present invention.
Figure 14:
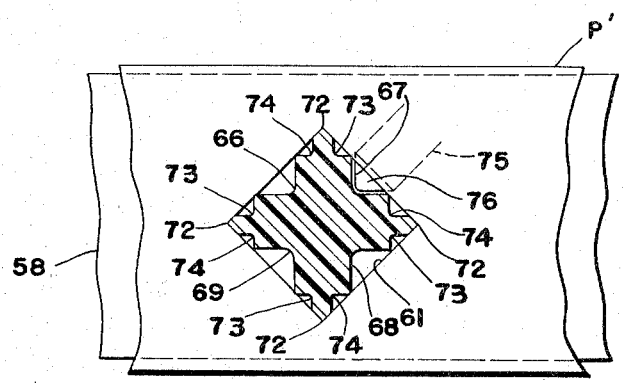
FIG. 14 is a longitudinal section view taken along the plane of line 14—14 of FIG. 13.

The fastener illustrated in FIGS. 13 to 15, inclusive, is of the same general type of that illustrated in FIGS. 1 to 12, inclusive, except that in this form the fastener 10a is particularly useful in attaching wire, tubing, cable or the like to a support panel P'. In the form shown, the fastener 10a includes a body 58 having a loop-like portion 59 at one end thereof to engageably retain therein an object, such as a tubing or the like, not shown. In this form, however, the depending shank 60 is preferably cruciform in cross section (FIG. 14) to provide rotary, fractional turn installation through a polygonal opening, such as a square shaped 61 opening in the panel P'. More specifically, the cruciform shank 60 includes four oppositely and angularly disposed legs 62–65 made integral with and defined by four oppositely disposed and generally curved surfaces 66–69 cut or molded out of the sides of the shank 60, as best shown at FIG. 15. The legs 62–65 each preferably include a pair of planar side surfaces 70 and 71 which converge into a sharp leading severable edge 72. The planar side surfaces 70 and 71 of each of the respective legs 62–65 are preferably cut or molded out adjacent the upper end, as at 73 and 74, to provide the leading severable edge 72 therebetween with a reduced cross-sectional thickness compared to that of the remainder of the material defining the leading severable edge 72 of each of the respective legs 62–65.

The reduced cross-sectional thickness of the leading severable edge 72 construction facilitates deformation of the cruciform shank 60, in such area, as the greater dimension of the shank 60 is turned transversely through the polygonal shaped opening 61 in the panel P' and thereby provides a firm gripping action with the confronting undersurface of the panel P'. Additionally, the relatively greater cross sectional thickness of the remainder of the material defining the leading edge 72 construction provides an abutment for limiting further axial movement of the shank 60 through the panel opening, and effectively prevents accidental withdrawl of the fastener from its final rotary, fractional turn installed position with the panel P'.

In the embodiment shown, the fastener 10a includes a similarly constructed flexible finger member 75 made integral with the body 58 of the fastener, except that in this form, the depending locking tab 76 is generally curved in cross section so as to correspond to the similarly curved space defined between any one of the curved surfaces 66–69 of the cruciform shank 60 and the corresponding confronting edge presented by the panel opening 61. Moreover, as the fastener is turned through an angle of approximately 45° into its final installed position, the depending locking tab 76 will automatically be disposed in substantially continuous surface-to-surface engagement between the shank 60 and the panel opening 61 to positively maintain the fastener in its final installed position.

The modified form of fastener 10b shown in FIGS. 16 to 18 inclusive, of the drawings, is generally of a similar type and operation as that illustrated in FIGS. 13 to 15, inclusive, including a body 77 having a loop-like portion 78 for attaching an object (not shown), such as a tubing or the like, to the support panel P'', and further including a flexible finger member 79 and depending locking tab 80 for maintaining the fastener in its final rotary, fractional turn installed position with the panel. The generally cruciform, in cross section, shank 81 includes four oppositely disposed and angularly oriented legs 82–85 made integral therewith and defined by oppositely disposed generally curved surfaces 86–89 cut or molded out of the sides of the shank 81. Each of the legs preferably includes a pair of planar side surfaces 90 and 91 which converge into sharp leading severable edges 92. In this form, however, the planar sides 90 and 91 are cut or molded, as at 93 and 94, to provide therebetween leading or cam-like planar surfaces 95 rather than leading severable edges 72, as in the form illustrated in FIGS. 13 to 15, which surfaces 95 taper in the general direction of rotation of the fastener. The respective cam-like surfaces 95 are preferably of a reduced cross-sectional thickness compared to that of the cross-sectional thickness of the lower portions of the legs 82–85 and for the reasons aforesaid. Moreover, in this form, and in the initial installed position of the fastener 10b, the planar cam-like surfaces 95 are disposed in surface-to-surface contact with the corresponding confronting marginal edges presented by the polygonal panel opening, such as the square-shaped opening 96 illustrated in FIG. 17. Accordingly, as the fastener is rotated through an angle of approximately 45° the greater dimension of the cruciform shank 81 is turned transversely of the panel opening 96 to cause the corresponding marginal edges of the opening to cut into the planar cam-like surface 95; and thereafter in the final rotary, fractional turn installed position of the fastener, the planar cam-like surfaces 95 are disposed in surface-to-surface engagement with the corresponding marginal edges presented by the panel opening 96.

From the foregoing description and accompanying drawings, it is apparent that the rotary, fractional turn fastener of the present invention provides many important advantages over heretofore known types of fastener devices for securing various objects such as molding, trim strips, wire, tubing, cable and the like, to an apertured support panel. More particularly the rotary, fractional turn fastener being made from polymeric materials provides a considerably simplified construction which can be readily and economically massed produced by conventional molding or extrusion techniques. In one form, the flexible locking construction being made integral with the fastener provides an arrangement which readily lends itself to use with support panels of varying thickness and with panel openings of various sizes and/or shapes and which automatically coacts with such panel openings to maintain the fastener in positive registration with the panel in its finalized rotary, installed position. The improved cruciform shaped fastener shank provides a simple, yet rugged construction which is more efficiently produced compared to heretofore known types of rotary fastening devices and which provides a greater adaptability to use with various sizes and thicknesses of support panels and to various sizes and/or configurations of panel openings. In addition, such improved cruciform shank construction having a plurality of severable edges and/or surface portions provides a considerably greater interlocking engagement with the panel opening due to the substantially surface-to-surface coacting engagement between the parts, resulting in a considerably greater precision in registration and stability between the parts, and prevents the inadvertent or accidental displacement of the fastener from interlocking engagement with the support panel.

The terms and expressions which have been employed, are used as terms of description and not of limitation, and there is no intention in the use of such terms and expression of excluding any equivalents of the features shown or described, or portions thereof, but it is recognized that various modifications are contemplated within the scope of the invention claimed.

I claim:

1. A rotary, fractional turn fastener made from polymeric materials comprising, a body, a shank extending from said body and adapted to be disposed through a noncircular opening in a support, and a member movable relative to said shank and adapted to coact with said fastener for locking the same to said support, said member including a flexible finger formed from said body, said finger including a tab portion disposed at one end thereof and adapted to be resiliently disposed between said shank and the confronting marginal edges presented by the opening in said support, said shank being generally cruciform in cross section, including a plurality of oppositely disposed curved side surfaces, and said tab portion including a curved surface to provide substantially surface-to-surface interlocking engagement between said shank and the confronting marginal edges presented by the opening in said support.

2. A rotary, fractional turn fastener made from polymeric materials comprising, a flexible body adapted to be disposed adjacent one side of a support, a shank including a nose portion depending downwardly from said body and adapted to be disposed through a polygonal shaped opening in said support, and a flexible finger-like member connected at one end to said body, said finger-like member including at its other end a depending tab portion adapted to be resiliently biased downwardly between said shank and the confronting marginal edges presented by the polygonal shaped opening to coactingly interlock said fastener in its final rotary installed position with said support, said shank being generally polygonal in cross section, and said tab portion being generally polygonal in cross section to provide substantially surface-to-surface interlocking engagement between said shank and the confronting marginal edges presented by the polygonal shaped opening in said support.

3. A rotary, fractional turn fastener in accordance with claim 2, wherein said shank is generally octagonal in cross section, and wherein said tab portion is generally triangular in cross section.

4. A rotary, fractional turn fastener in accordance with claim 2, wherein said shank is generally cruciform in cross section, and wherein said tab portion is partially curved in cross section.

5. A rotary, fractional turn fastener in accordance with claim 2, including retaining means disposed adjacent opposed ends of said body for snap-fastening securement of an object, such as molding, trim strip or the like, to said support.

6. A rotary, fractional turn fastener made from polymeric materials for insertion through a polygonal opening in a support member, comprising, an elongated body adapted to be disposed adjacent one side of a support member, a shank depending downwardly from said body and adapted to be inserted through the opening in said support member, said shank including a plurality of integrally connected, vertically extending legs which together define a generally cruciform shape in cross section, each of said legs including a tapered, severable edge projecting outwardly therefrom and extending vertically from said body, said edges having a substantially reduced cross-sectional width as compared to the cross-sectional width of their respective legs, each of said edges having axially extending cut-out portions on opposed sides thereof adjacent the juncture of said shank with said body, the transverse distance between oppositely disposed of said edges being greater than the maximum transverse dimension of the opening in said support member, and said edges being adapted to be progressively severed by the confronting marginal edges presented by the opening in said support member upon rotary, fractional turning of said fastener with respect to said support member.

7. A rotary, fractional turn fastener in accordance with claim 6, wherein the transverse distance between the end surfaces of said legs is generally the same as the maximum transverse dimension of the opening in said support member for surface-to-surface interlocking engagement of said end surfaces with the confronting marginal edges presented by the opening in said support member.

8. A rotary, fractional turn fastener in accordance with claim 6, wherein said body includes an integral, resilient loop-like portion disposed adjacent at least one end thereof, and adapted for holding an article in snap-fastening engagement on said support member.

9. A rotary, fractional turn fastener in accordance with claim 2, wherein said shank includes a plurality of severable edges extending downwardly from said body adapted to be progressively severed by the confronting marginal edges presented by the opening in said support member upon rotary, fractional turning of said fastener relative to said support member.

10. A rotary, fractional turn fastener in accordance with claim 2, wherein said nose portion is of a polygonal shape in cross section and includes a plurality of shoulder portions extending outwardly adjacent the juncture of said nose portion with said shank and adapted to overlie the marginal edges presented by the opening in said support member upon rotary movement of said fastener relative to said support member, said shoulder portions having cam-like surfaces tapered in the general direction of rotation of said fastener for progressively drawing said body into tight abutting engagement with said support member.

11. A rotary, fractional turn fastener in accordance with claim 2, wherein said body includes a resilient loop-like portion made integral at one end thereof and adapted for holding an article in snap-fastening engagement on said support member.

12. A rotary, fractional turn fastener made from polymeric materials and adapted for insertion through a polygonal opening in a support member, said fastener comprising an elongated body adapted to be disposed adjacent one side of said support member, a polygonal shank extending downwardly from said body and adapted to be inserted through the opening in said support member, and a vertically oriented locking member made integral with the material of said body and adapted to be forcibly depressed downwardly from said body and into coacting interlocking engagement between said shank and the confronting marginal edges presented by the opening in said support member to prevent rotational movement of said fastener in the installed position on said support member.

13. A rotary, fractional turn fastener in accordance with claim 12, wherein said locking member has a polygonal shape in transverse cross-section to provide a substantially surface-to-surface interlocking engagement between said shank and the confronting marginal edges presented by the opening in said support member.

References Cited by the Examiner

UNITED STATES PATENTS

| 355,980 | 1/1887 | Dimon | 85—7 X |
| 474,747 | 5/1892 | Kirby | 85—5 X |
| 3,049,369 | 8/1962 | Trafton | 24—224 X |
| 3,116,526 | 1/1964 | Cochran | 24—73 |
| 3,179,367 | 4/1965 | Rapata | 24—221 X |

FOREIGN PATENTS

| 1,354,587 | 1/1964 | France. |

WILLIAM FELDMAN, *Primary Examiner.*

E. SIMONSEN, *Assistant Examiner.*